(No Model.)
A. E. HERMAN.
FIFTH WHEEL.
No. 426,271.  Patented Apr. 22, 1890.
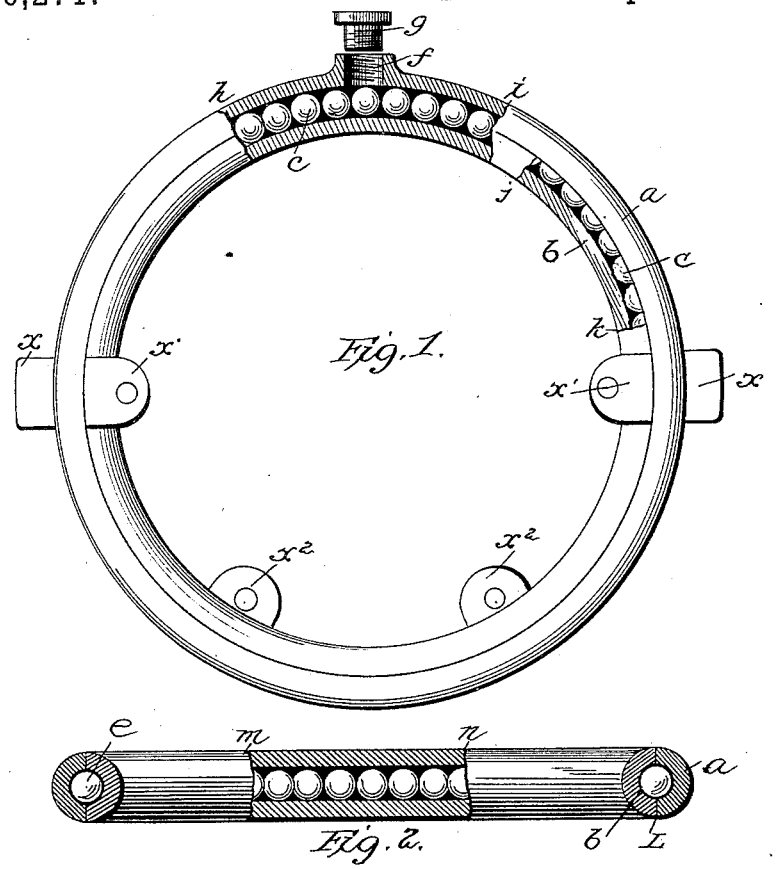
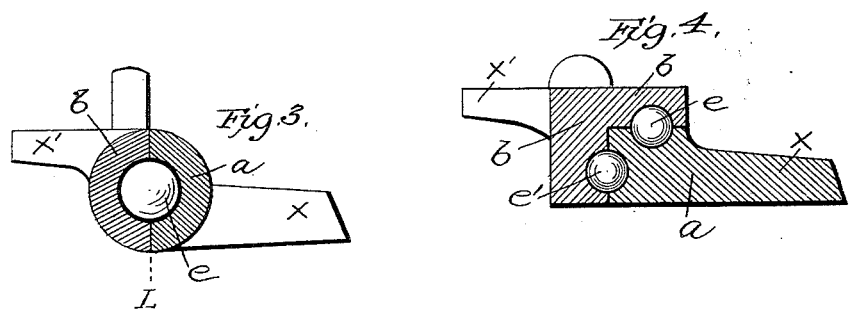
Attest
Walter P. Keene,
James M. Shear
Inventor
A. E. Herman
by Walter Donaldson & Co.
Attys.

UNITED STATES PATENT OFFICE.

ADOLPH E. HERMAN, OF TERRE HAUTE, INDIANA.

FIFTH-WHEEL.

SPECIFICATION forming part of Letters Patent No. 426,271, dated April 22, 1890.

Application filed August 20, 1888. Serial No. 283,288. (No model.)

*To all whom it may concern:*

Be it known that I, ADOLPH E. HERMAN, of Terre Haute, Vigo county, Indiana, have invented a new and useful Improvement in Fifth-Wheels for Vehicles, of which the following is a specification.

In the drawings, Figure 1 is a plan of the wheel with parts broken away. Fig. 2 is a vertical section with part of the ring or circular section $b$ broken away. Fig. 3 is an enlarged cross-section of the wheel through the lugs $x\ x'$ in Fig. 1, the balls being removed. Fig. 4 is a view of a modification.

The broad feature of my invention consists of an inner ring supported horizontally to one part of the running-gear, an outer ring also arranged horizontally and about the periphery of the inner ring, the line of separation between the rings being vertical, and a connection between the periphery of the inner ring and the outer ring, by which they are supported to each other against vertical displacement and are allowed to turn.

Each ring is provided with a groove $e$, the ring $a$ having the groove in its inner circumference, and the ring $b$ in its outer circumference. When the two rings are put together, the grooves $e$ become a proper receptacle for the balls $c$, which are inserted into the grooves, after the rings are put together, through the opening $f$, closed by the set-screw $g$, the balls $c$ practically filling the grooves all the way around the rings.

The purpose of the balls $c$ is twofold—viz., to hold the two rings together and to permit the ring $a$ to turn round when the forward part of the vehicle is turning in a curve or circle.

From $h$ to $i$ in Fig. 1 the upper half of each is broken away, showing the position of the balls $c$.

From $j$ to $k$ in Fig. 1 only the upper half of the inner ring $b$ is broken away, showing that half of the balls upon which the ring $b$ turns and in contact with said balls $c$.

The curved line L shows the line of vertical separation between sections $a$ and $b$.

From $m$ to $n$ in Fig. 2 the inner ring $b$ is broken away, showing the groove $e$ in ring $a$ and the balls $c$.

Fig. 3 is a cross-section of one side of the wheel through the lugs $x\ x'$ in Fig. 1.

The ring $a$, by means of the lugs $x\ x$, is attached to the lower part of the running-gears or axle of the vehicle, and the ring $b$, by means of the lugs $x'\ x'\ x^2\ x^2$, is attached to the upper part of the running-gear of the vehicle.

For the purpose of strength to the wheel sections $a$ and $b$ may each be provided with two annular grooves instead of one, and so fitted together that two rows of balls may be inserted into the grooves between the vertically-separated sections $a$ and $b$.

Fig. 4 is a cross-section, at a point corresponding with Fig. 3, of a wheel having two rows of balls. This wheel is convenient for heavy vehicles.

The balls which lie in the grooves $e$ between those parts of the circular sections $a$ and $b$ which are horizontally separated bear the load of the vehicle, whereas the balls that lie in the grooves $e'$ between those parts of the circular sections $a$ and $b$ which are vertically separated hold the two sections $a$ and $b$ together, and said balls are inserted through an opening $f$, as above described.

Instead of the balls $c$, pewter, brass, or other suitable metal may be melted and poured into the grooves $e$ through the opening substantially as the balls are inserted.

I claim as my invention—

1. In combination, the inner horizontal ring having a grooved vertical inner periphery, with means to permit horizontal attachment to the running-gear, the outer horizontal section arranged about the inner ring, with its inner vertical periphery abutting against the outer vertical periphery of the inner ring, means for supporting said ring in a horizontal position, and means independent of the rings horizontally arranged between the vertical meeting peripheries into the grooves for supporting the rings to each other against vertical displacement and to allow movement of the rings circumferentially, substantially as described.

2. In combination, the two horizontal rings, with means for supporting said rings horizontally, said rings having a vertical and a horizontal bearing-face between them provided with grooves, and the connection between the horizontal faces located in the grooves thereof for sustaining the load and preventing lateral displacement of the rings, and the connection between the vertical faces located in the grooves thereof to prevent vertical displacement, substantially as described.

3. In combination, the outer and inner rings, each having a groove in its vertical face, the connecting-balls between the grooved vertical faces of the ring, each of the said rings having lugs to permit horizontal attachments to the running-gear and body, substantially as described.

ADOLPH E. HERMAN.

Witnesses:
  ROBERT J. SMITH,
  GEO. A. SCOTT.